US007787776B2

(12) United States Patent
Sharma

(10) Patent No.: US 7,787,776 B2
(45) Date of Patent: Aug. 31, 2010

(54) METHOD AND APPARATUS FOR USING INFRARED SENSORS TO TRANSFER DATA WITHIN A SECURITY SYSTEM

(75) Inventor: Raman Kumar Sharma, Toronto (CA)

(73) Assignee: Tyco Safety Products Canada Ltd., Toronto, Ontario (CA)

( * ) Notice: Subject to any disclaimer, the term of this patent is extended or adjusted under 35 U.S.C. 154(b) by 1018 days.

(21) Appl. No.: 11/498,924

(22) Filed: Aug. 3, 2006

(65) Prior Publication Data

US 2008/0031206 A1 Feb. 7, 2008

(51) Int. Cl.
*H04B 10/00* (2006.01)

(52) U.S. Cl. ....................... 398/151; 398/135; 398/127; 340/552; 340/545.1; 370/338; 370/401

(58) Field of Classification Search ................ 398/151, 398/164, 135, 115, 116, 117, 124, 126, 127, 398/128, 130, 106, 107; 340/521, 541, 429, 340/517, 539.22, 552, 545.1, 545.7, 506; 370/338, 401

See application file for complete search history.

(56) References Cited

U.S. PATENT DOCUMENTS 4,727,600 A * 2/1988 Avakian ..................... 398/126
5,764,146 A 6/1998 Baldwin et al.
5,971,597 A 10/1999 Baldwin et al.
6,385,772 B1 5/2002 Courtney
6,661,340 B1 * 12/2003 Saylor et al. ................ 340/517
6,956,478 B2 * 10/2005 Oyagi et al. ................ 340/541
7,242,292 B2 7/2007 Berezowski et al.
2006/0271695 A1 * 11/2006 Lavian ....................... 709/229
2007/0182543 A1 * 8/2007 Luo ........................... 340/521

FOREIGN PATENT DOCUMENTS

JP 2004-318641 A2 11/2004

OTHER PUBLICATIONS

EP Search Report; The Hague; Aug. 20, 2009; Reference P524535EPPCT/DP; App Mp/ 07763845.0—1232/2047446 PCT/ CA2007001179; 5 pages.

* cited by examiner

*Primary Examiner*—Hanh Phan
(74) *Attorney, Agent, or Firm*—The Small Patent Law Group LLP

(57) ABSTRACT

A security system comprises a system control panel for monitoring at least one device on a network. An infrared (IF) sensor located on the network has an IR transmitter and an IR receiver. The IR transmitter transmits control data packets and the IR receiver detects received data packets and IR data. A processor provides the control data packets to be transmitted by the IR transmitter. The processor determines that an external communication device is initiating communication with a target device over the network based on at least the received data packet received by the IR receiver. The processor establishes bi-directional communication over the network between the external communication device and the target device which is one of the processor, the system control panel and the at least one device.

19 Claims, 4 Drawing Sheets

METHOD AND APPARATUS FOR USING INFRARED SENSORS TO TRANSFER DATA WITHIN A SECURITY SYSTEM

BACKGROUND OF THE INVENTION

This invention relates generally to security systems, and more particularly, to providing multiple electronic points of access to the network of the security system.

Security systems within homes and office buildings are formed using a series of networked devices. A system controller is typically installed in a location such as a basement, utility room or closet. The system controller monitors and/or controls the devices installed on the network, which may be sensors to monitor and control access to doors, smoke and/or heat sensors, temperature control and the like.

Several types of sensors may be used to detect door openings and closings. A sensor is typically installed proximate to each door that is to be monitored. For example, mechanical contacts, reed switch/magnet combinations, and infrared (IR) sensors may be used.

Over time, software updates, upgrades, changes in configuration, and calibrations are installed and/or performed on the security system and/or devices installed on the system. Devices may have a terminal or test point through which the adjustments may be manually performed, but this is difficult and inefficient, as well as intrusive into an area which may be in use. Also, data logs, such as a log record of when and how many times a door is accessed or a log of temperature changes within an area of the building, may be accessed for security or maintenance reasons. Installation, monitoring and upgrading functions are typically accomplished at the system controller, such as via laptop computer. As the system controller is typically located in an area that may be difficult and/or inconvenient to access, it may be more difficult to perform these functions in a timely manner and/or on a regular basis as desired.

Therefore, a need exists for providing an ability to communicate with the system controller and other devices installed on the network of the security system from additional locations on the network. Certain embodiments of the present invention are intended to meet these needs and other objectives that will become apparent from the description and drawings set forth below.

BRIEF DESCRIPTION OF THE INVENTION

In one embodiment, a security system comprises a system control panel for monitoring at least one device on a network. An infrared (IF) sensor located on the network has an IR transmitter and an IR receiver. The IR transmitter transmits control data packets and the IR receiver detects received data packets and IR data. A processor provides the control data packets to be transmitted by the IR transmitter. The processor determines that an external communication device is initiating communication with a target device over the network based on at least the received data packet received by the IR receiver. The processor establishes bi-directional communication over the network between the external communication device and the target device which is one of the processor, the system control panel and the at least one device.

In another embodiment, a method for using an IR sensor interconnected with a security system to communicate with an external communication device comprises transmitting a control data packet with an IR transmitter of an IR sensor. A received data packet is received with an IR receiver of the IR sensor. The control data packet and the received data packet are compared to determine whether an external communication device has transmitted the received data packet. Bi-directional communication is established between the external communication device and a target device based on the comparison of the control data packet and the received data packet. The target device is interconnected with the IR sensor and the security system on the network.

In another embodiment, a security system comprises a system control panel for monitoring at least one device on a network. An IR sensor is located on the network and has an IR transmitter and an IR receiver. The IR receiver receives external data packets from an external communication device. Means for establishing bi-directional communication between the external communication device and a target device located on the network are provided.

Figure 1:
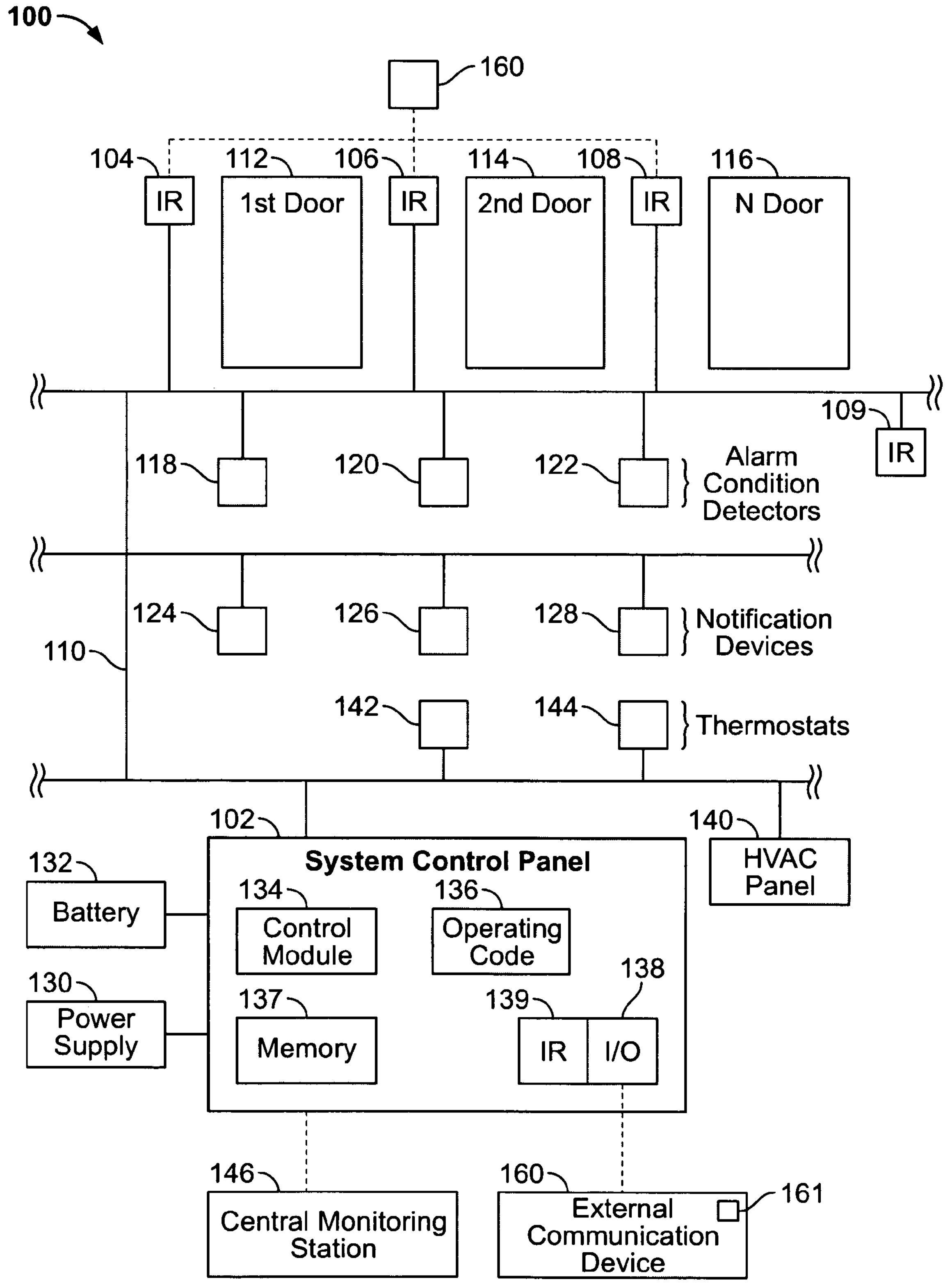
FIG. 1 illustrates an alarm system which has a system control panel for monitoring and/or controlling devices installed on a network formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION OF THE INVENTION

FIG. 1 illustrates an alarm system 100 which has a system control panel 102 for monitoring and/or controlling devices installed on a network 110. The devices may detect and/or control door openings and closings, detect alarm conditions, notify people within an area about alarm conditions, track and/or control temperature, or accomplish other functions which may be desired. For example, the system 100 may be used within a light industrial building or a residence.

The system 100 has one or more infrared (IR) sensors, such as first IR sensor 104, second IR sensor 106 and N IR sensor 108 which may be configured to control and/or monitor first door 112, second door 114 and N door 116, respectively, as well as facilitate bi-directional communication between an external communication device 160 and the system control panel 102 and/or other addressable devices over the network 110. Optionally, IR sensors 109 and 139 may be installed in locations not proximate a door to provide additional locations for convenient communication access. Each of the IR sensors 104, 106, 108, 109 and 139 has a unique address on the network 110.

Alarm condition detectors 118, 120 and 122 may be connected on the network 110 and are monitored by the system control panel 102. The detectors 118-122 may detect fire, smoke, temperature, chemical compositions, or other hazardous conditions. When an alarm condition is sensed, the system control panel 102 transmits an alarm signal to one or more addressable notification device 124, 126 and/or 128 through the network 110. The addressable notification devices 124, 126 and 128 may be horns and/or strobes, for example.

The system control panel 102 is connected to a power supply 130 which provides one or more levels of power to the system 100. One or more batteries 132 may provide a back-up power source for a predetermined period of time in the event of a failure of the power supply 130 or other incoming power. Other functions of the system control panel 102 may include showing the status of the system 100, resetting a component, a portion, or all of the system 100, silencing signals, turning off strobe lights, and the like.

The network 110 is configured to carry power and communications to the addressable notification devices 124-128 from the system control panel 102. Each addressable notification device 124-128 has a unique address and may be capable of bi-directional communication with the system control panel 102, the first through N IR sensors 104-108, and the IR sensors 109 and 139. The addressable notification devices 124-128 may communicate their status and functional capability to the system control panel 102 over the network 110.

The system control panel 102 has a control module 134 which provides control software and hardware to operate the system 100. Operating code 136 may be provided on a hard disk, ROM, flash memory, stored and run on a CPU card, or other memory. An input/output (I/O) port 138 provides a communication interface at the system control panel 102 via a cable (not shown) with the external communication device 160 such as a laptop computer.

Alternatively, the IR sensor 139 may be associated with the I/O port 138 to provide bi-directional wireless communication between the I/O port 138 and the external communication device 160. Other types of external communication devices 160 having an IR transceiver may be used, such as laptop computer, phone, pager, personal digital assistant (PDA) or other portable device.

The IR sensor 139 may also be used as a proximity sensor to detect tampering with the system control panel 102. The system control panel 102 may be installed inside a plastic or metal case or cabinet (not shown), and thus the IR sensor 139 is visible only when the case is open. If the case is opened, a tamper signal may be generated.

The external communication device 160 has a memory 161 for storing knowledge about the system 100, such as system configuration, serial numbers of devices, part numbers of devices, addresses of devices on the network 110, known desired actions such as calibrations, retrieval of data logs, and the like. An approved identifier, such as an identification code, token, or other security code is stored in the memory 161 and used by the system 100 to authenticate the external communication device 160. Each external communication device 160 which is allowed to communicate with the system 100 may be preauthorized or a password may be used or requested. The information stored in memory 161 associated with the system 100 is used by the external communication device 160 to form an external data packet.

A corresponding list of approved identification codes may be stored in the memory 137 of the system control panel 102. Authentication of the external communication device 160 may also be accomplished by further requesting a password, key code, access code, or other approved identifier.

A heating, ventilation and air-conditioning (HVAC) panel 140 may also be communicating with the system control panel 102 on the network 110. One or more thermostats 142 and 144 may be interconnected with the system 100 and controlled and monitored by the control module 134.

A central monitoring station 146 may receive communications from the system control panel 102 regarding security problems and alarm conditions. The central monitoring station 146 is typically located remote from the system 100 and provides monitoring to many alarm systems.

Figure 2:
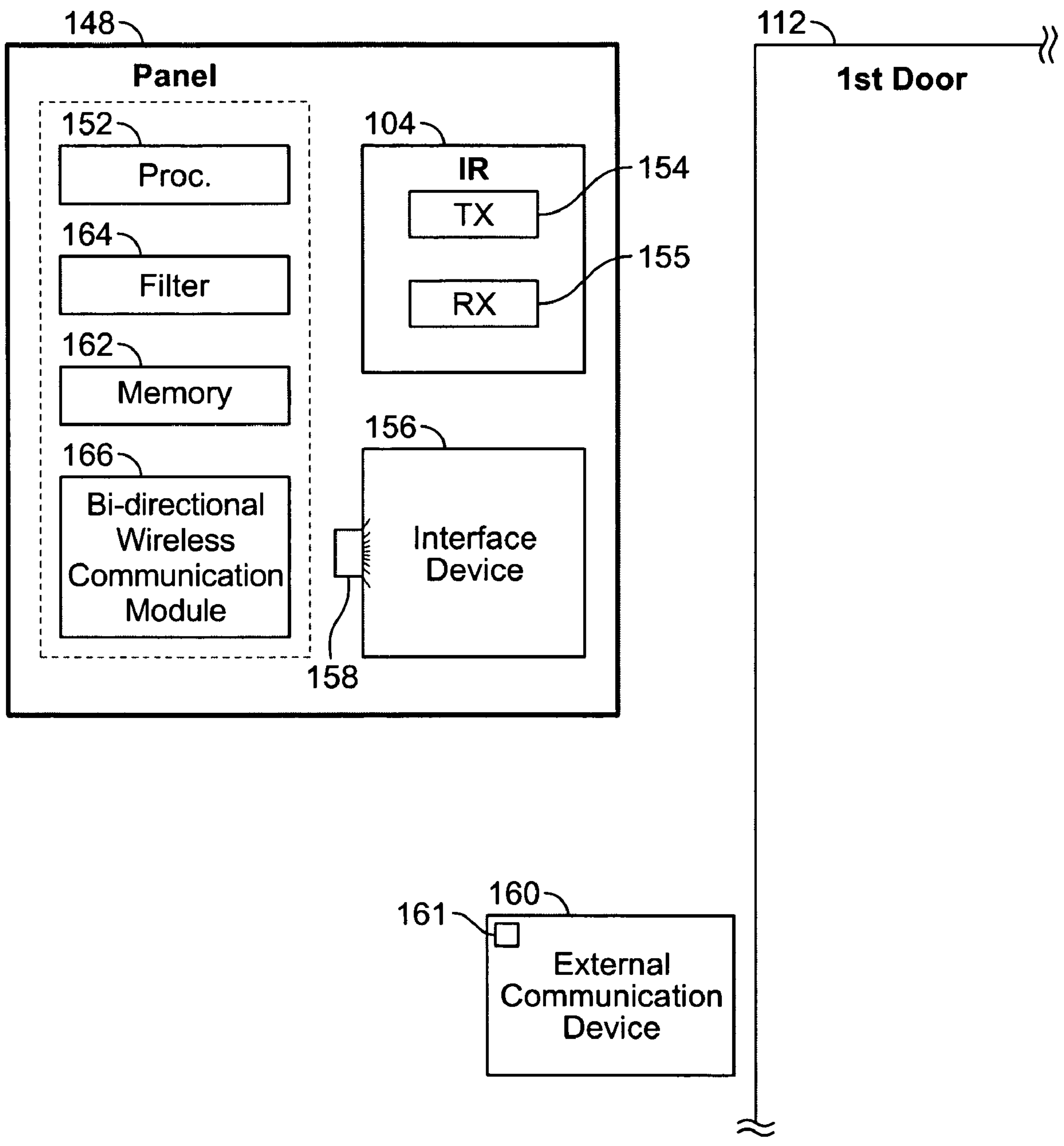
FIG. 2 illustrates the first IR sensor which may be used to facilitate data transmission between an external communication device and one or more devices installed on the network in accordance with an embodiment of the present invention.

FIG. 2 illustrates the first IR sensor 104 which may be used to facilitate data transmission between the external communication device 160 and one or more devices installed on the network 110. The first IR sensor 104 may also function as a proximity sensor to detect an open or closed position of the first door 112 or to detect the presence of an object. Although only the first IR sensor 104 is discussed, other IR sensors on the network 110 may provide all or a portion of the same functionality.

The first IR sensor 104 is illustrated proximate to the first door 112 and has an IR transmitter 154 and an IR receiver 155. The first IR sensor 104 may be installed in a panel 148 and may have a field of view of approximately 60 degrees. The field of view may include, but is not limited to, a surface of the first door 112. The first IR sensor 104 may also be installed on another surface proximate to the first door 112, such as a wall or door frame above or beside the first door 112 with or without the panel 148 being installed.

The panel 148 is connected to the network 110 and may have a processor 152, memory 162, filter 164, and a bi-directional wireless communication module 166. Alternatively, the processor 152, memory 162, filter 164 and bi-directional communication module 166 may be housed together with the first IR sensor 104 on a single chip or small circuit board for installation without the panel 148. The processor 152 may control the IR transmitter 154 within the first IR sensor 104 to flash quickly, such as to flash every 50 ms or every second. Flashing reduces current consumption compared to IR sensors which continually transmit infrared signals, and enables data transmission, as well as providing proximity detection (if desired).

The list of approved identification codes may also be stored in the memory 162. It may be desirable to use the external communication device 160 to upload a software change, update to the system control panel 102, or upload a flash upgrade. Thus, the first IR sensor 104 is used as a conveniently accessed gateway to the network 110. In addition, information may be retrieved by the external communication device 160 such as data logs, trouble logs, access logs tracking when a specific door is opened and closed, temperature logs from one or more thermostats, and the like. The external communication device 160 may also be used for calibration and change of functionality, such as to calibrate sensors which may be newly installed or replaced on the network 110, or when it is desired to reset or change current settings. Dust levels on the IR sensors 104-108 may also be monitored.

An interface device 156 with an optional backlight 158 may be installed on the panel 148. The interface device 156 may provide one or more of a keypad, fingerprint reader, card reader, Radio Frequency Identification (RFID) reader, alphanumeric (A/N) display, speaker, or other device. For example, if a keypad is available, a user may enter access codes and/or manually change settings at the panel 148. If installed in the panel 148, the first IR sensor 104 may be used to detect the presence of an object, such as a hand, in close proximity to the panel 148, and in response may turn on the backlight 158, activate one or more of the available interface devices, or activate interface circuitry, such as enable the RFID reader.

If used as a proximity sensor, the processor 152 may define a duty cycle having an active period and an idle period for the IR transmitter 154. The IR transmitter 154 transmits a control data packet during the active period. The IR receiver 155, however, is always active and is always receiving IR data and received data packets. IR data may be infrared background noise, while a received data packet may be a reflected control data packet which has been reflected off an object, or may be an external data packet transmitted from the external communication device 160.

The filter 164 samples IR data acquired by the IR receiver during the idle period when the IR transmitter 154 is not transmitting to determine a level of background noise. When the IR receiver 155 detects a received data packet, the filter 164 filters the received data packet to remove background noise based on a previously determined level of background noise.

The processor 152 then compares the received data packet to the control data packet to determine if the received data packet has been reflected off an object or transmitted from the external communication device 160. If the control and received data packets are different, the processor 152 determines that the external communication device 160 is attempting to establish communication with one or more devices on the network 110. If the control and received data packets are the same, the control data packet may be reflected off the first door 112 as a reflected control data packet (such as when the first door 112 is closed) or off another object, such as a hand or identification item, or the inside of the case of the system control panel 102 (as with IR sensor 139 of FIG. 1). If the IR receiver 155 does not receive a received data packet, the first door 112 may be open and no external communication device 160 is attempting to gain access to the network 110.

Figure 3:
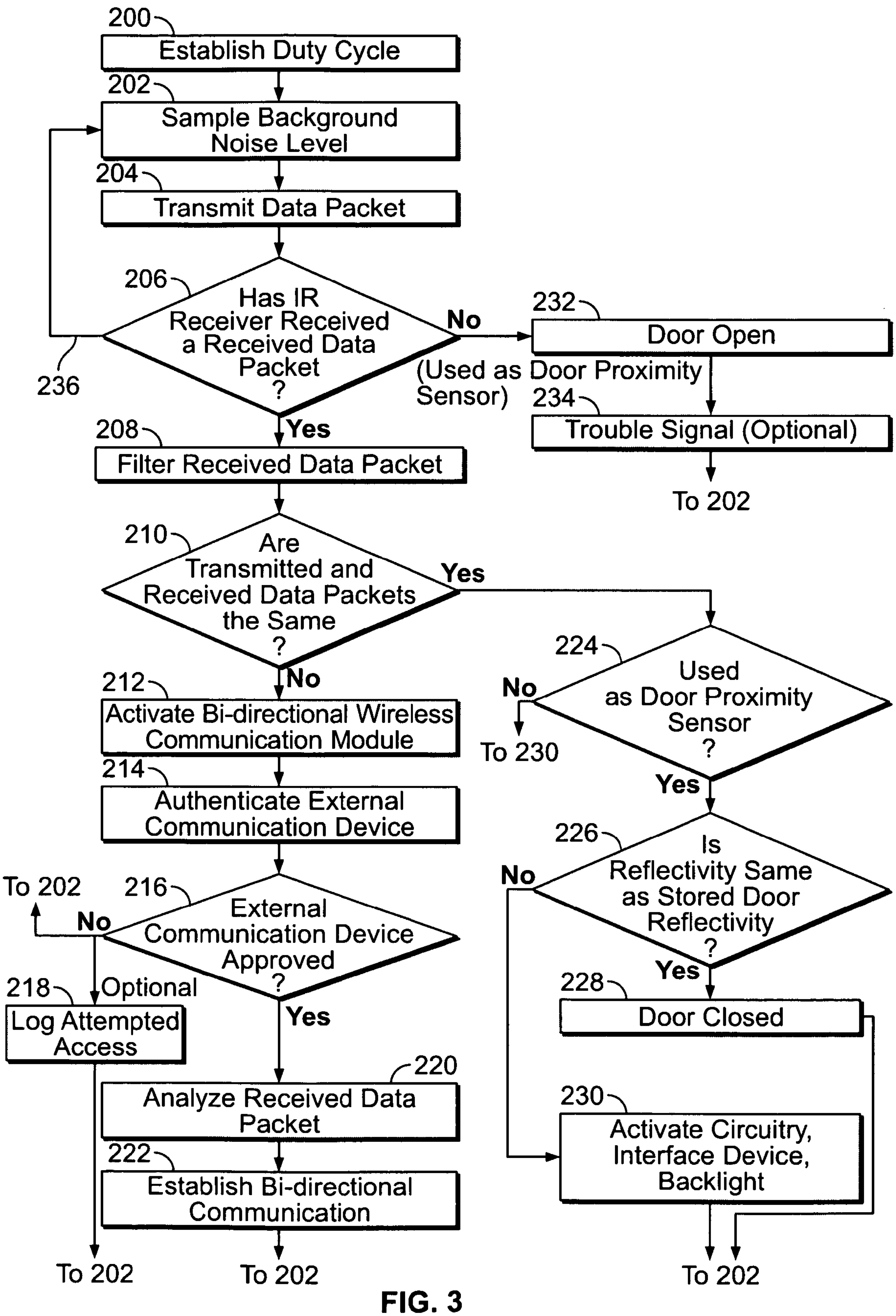
FIG. 3 illustrates a method for establishing bi-directional communication between at least one device on the network and the external communication device in accordance with an embodiment of the present invention.

FIG. 3 illustrates a method for establishing bi-directional communication between at least one device on the network 110 and the external communication device 160. A two-way wireless communication protocol may be stored within the bi-directional wireless communication module 166 (FIG. 2). The two-way wireless communication protocol may be known in the art, such as industry standard protocols compliant with Infrared Data Association (IrDA), or other two-way protocols may be used to transfer data wirelessly between the first IR sensor 104 and the external communication device 160. Alternatively, the two-way wireless communication protocol may be unique to the system 100.

At 200, the processor 152 establishes the duty cycle defining how often the IR transmitter 154 will transmit the control data packets. In other words, the time durations of the active period and idle period are determined. The duty cycle may not apply after the bi-directional wireless communication protocol is activated. At 202, the processor 152 samples a level of background noise during the idle period of the IR transmitter 154. The processor 152 may sample the level of background noise one or more times during a single idle period, and the sampling may be repeated during each idle period as the level of light may change over time due to sunlight, electric lights being turned on and off, and the like. Optionally, the sampling may be stopped temporarily while the bi-directional communication is occurring, or sampling may be performed less frequently.

At 204, the IR transmitter 154 transmits the control data packet. The control data packet may be a beacon or broadcast signal, and may be defined by the two-way wireless communication protocol being used. At 206, the processor 152 determines whether the IR receiver 155 has received a received data packet. The IR receiver 155 is always "on" or always receiving infrared light and/or data packets. The received data packet may also be referred to as an external data packet if transmitted from the external communication device 160. If the first IR sensor 104 is configured as a proximity sensor, the IR receiver 155 may receive a reflected control data packet virtually simultaneously as the IR transmitter 154 transmits the control data packet.

202 through 206 may be continually performed as illustrated by line 236 to maintain an accurate level of background noise and to detect proximity of an object, if so configured. However, depending upon whether the two-way wireless communication protocol supports simultaneous proximity detection, the 202-206 may be suspended while two-way communication is occurring.

At 206, if the IR receiver 155 does not receive a received data packet and the first sensor 104 is being used as a door proximity sensor, flow passes to 232 where the processor 152 determines that the first door 112 is open. Optionally, the processor 152 may log the door opening and may optionally monitor to log an associated door closing. If the associated door closing does not occur within a predetermined period of time, a trouble signal (234) may be initiated. Optionally, the processor 152 may initiate a trouble signal based on detection of the first door 112 opening during particular times of day, such as outside of established business hours.

Returning to 206, if the IR receiver 155 receives a received data packet, the method passes to 208 where the filter 164 filters the received data packet based on the most recent level of background noise (202).

Figure 4:
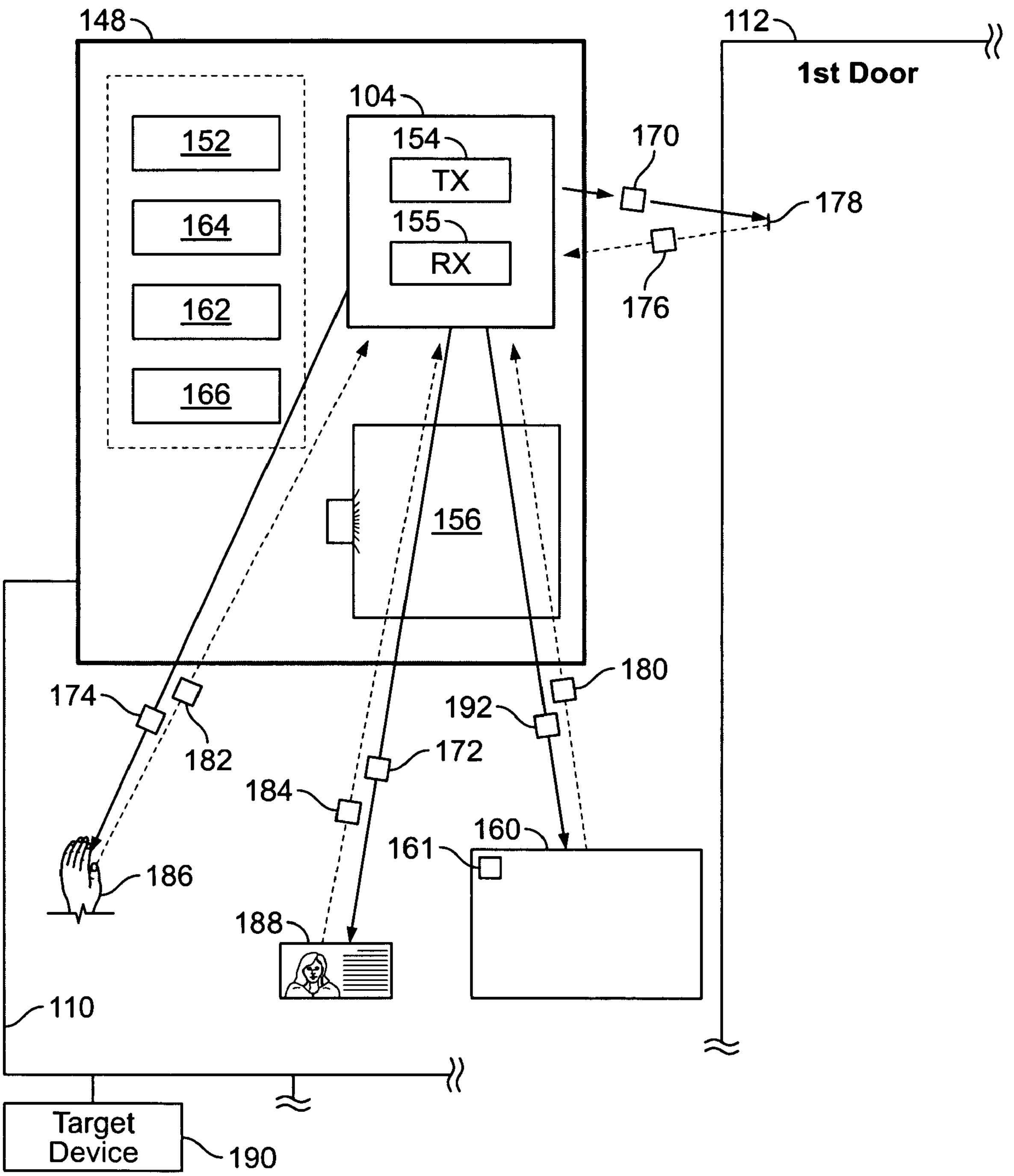
FIG. 4 illustrates an IR sensor configured to facilitate bi-directional communication between the external communication device and devices on the network as well as function as a proximity sensor to sense the position of the first door and an object such as a hand in accordance with an embodiment of the present invention.

FIG. 4 illustrates the first IR sensor 104 configured to facilitate bi-directional communication between the external communication device 160 and one or more devices on the network 110, as well as to function as a proximity sensor sensing the position of the first door 112 and an object. In this example, the range of transmission of the first IR sensor 104, which may be 60 degrees, includes the first door 112 as well as area proximate the interface device 156 of the panel 148. The IR transmitter 154 may transmit a plurality of control data packets 170, 172 and 174 (204 of FIG. 3). The contents of the control data packets 170-174 may be the same; however, different item numbers are used for clarity.

The control data packet 170 may be reflected by the first door 112 at point 178 as reflected control data packet 176. As illustrated, the control data packets 172 and 174 may be reflected by badge 188 and hand 186, respectively, and detected by the IR receiver 155 as reflected control data packets 182 and 184. The external communication device 160 may transmit an external data packet 180. For clarification, the reflected control data packets 176, 182 and 184 and the external data packet 180 are considered as received data packets from the perspective of the IR receiver 155.

Returning to FIG. 3, in 210, the processor 152 compares the received data packet to the control data packet 170-174. If the received data packet is different than the control data packet 170-174, the method passes to 212. The processor 152 has identified that the external communication device 160 is attempting to establish communication and activates the bi-directional wireless communication module 166 to initiate a handshaking protocol of the two-way wireless communication protocol. The two-way wireless communication protocol may or may not be configured to continue sending control data packets to detect proximity as discussed previously. At 214, the processor 152 attempts to authenticate the external communication device 160, such as by determining if the received data packet has an identifier or token (stored in the memory 161 of the external communication device 160) matching the identification codes stored in memory 162.

At 216, the processor 152 determines whether the external communication device 160 is an approved device. If not, communication is not established between the external communication device 160 and the network 110 and the method returns to 202. Optionally, at 218 a log may be maintained in the memory 137 or 162 of attempts or perceived attempts to access the network 110. Additional information might also be logged, such as time of attempt and any data received from the external communication device 160. Optionally, if an unapproved external device attempts to establish communication, a trouble or tamper signal may be generated and sent to the central monitoring station 146.

If the external communication device 160 is approved at 216, at 220 the processor 152 analyzes the contents of the received data packet to identify a target device 190, nature of desired communication, actions desired such as updating functionality, calibration, and the like. The target device 190 may be any addressable component on the network 110 and may be identified by one or more of serial number, part number, network address and the like.

At 222, the processor 152 may then establish a bi-directional communication link between the external communication device 160 and the target device 190. The processor 152 acts to facilitate the transfer of data between the external communication device 160 and the target device 190 over the network 110.

The external communication device 160 transmits external data packets 180 according to the two-way wireless communication protocol which are received by the IR receiver 155. The external data packets may be filtered (208 of FIG. 3) and processed by the processor 152. At least a portion of the packets are sent on the network 110 by the processor 152 to be received by the target device 190. The target device 190 may in turn complete a desired action, return target device data packets including requested data such as status logs, or complete a calibration or other sequence. The processor 152 receives target device data packets 192 which are then transmitted by the IR transmitter 154 to the external communication device 160. When the communication session is done, the method returns to 202.

The IR transmitter 154 may continue to transmit the control data packet (204) during the active period if other functions are desired and/or allowed while bi-directional communications are in process, and the processor 152 may continue to sample the background noise level (202). The ability to transmit control data packets and detect reflected control data packets may be determined by the two-way wireless communication protocol and thus may be transmitted at times other than during the idle period as previously discussed.

Returning to 210, if the received data packet is the same as the control data packet 170-174, the method passes to 224. If the first IR sensor 104 is being used as a proximity sensor to detect the position of the first door 112, the method passes to 226 where the processor 152 may compare signal levels of the filtered received data packet to a stored door reflectivity level to determine whether the reflected control data packet 176 was reflected from the first door 112 or a different surface. If the reflectivity levels are the same, the processor 152 determines that the first door 112 is closed (228) and returns to 202.

If the reflectivity levels are not the same (at 226) or if the first IR sensor 104 is not being used as a door proximity sensor (at 224), the method passes to 230. The processor 152 may determine that an object has been held in close proximity to the first IR sensor 104 and has reflected the control data packet 172 and 174 (such as reflected data packets 182 and 184 of FIG. 4). The processor 152 may then initiate an action such as activating a backlight, activating RFID circuitry, opening the first door 112, and the like.

It should be understood that the processor 152 may accomplish one or more of the discussed functions simultaneously, such as establishing and facilitating two-way communication between the external communication device 160 and the target device 190 on the network 110, verifying the position of the first door 112, and monitoring for, and responding to, the presence of an object held near the first IR sensor 104. Therefore, certain security measures, such as requiring an access code to be entered or logging the position of the first door 112, may be enabled while the first IR sensor 104 is providing the bi-directional wireless communication functionality.

While the invention has been described in terms of various specific embodiments, those skilled in the art will recognize that the invention can be practiced with modification within the spirit and scope of the claims.

What is claimed is:

1. A security system, comprising:

a system control panel for monitoring at least one device on a network;

an infrared (IR) sensor located on the network and having an IR transmitter and an IR receiver, the IR transmitter transmitting control data packets, the IR receiver detecting received data packets; and a processor configured to provide the control data packets to be transmitted by the IR transmitter, the processor determining that an external communication device is initiating communication with a networked target device based on at least one of the received data packets received by the IR receiver, the processor establishing bi-directional communication between the external communication device and the target device, the target device being any of the processor, the system control panel and the at least one device.

2. A security system, comprising:

a system control panel for monitoring at least one device on a network;

an infrared (IR) sensor located on the network and having an IR transmitter and an IR receiver, the IR transmitter transmitting control data packets, the IR receiver detecting received data packets; and a processor configured to provide the control data packets to be transmitted by the IR transmitter, the processor comparing the control data packets and the received data packets, the processor determining that an external communication device is initiating communication with a networked target device based on at least one of the received data packets received by the IR receiver, the processor establishing bi-directional communication between the external communication device and the target device when at least one of the control data packets is different with respect to at least one of the received data packets, the target device being any of the processor, the system control panel and the at least one device.

3. The system of claim 2, wherein the IR sensor is located remote from at least one of the system control panel or the at least one device.

4. The system of claim 2, further comprising:

the target device sending target device data packets over the network to the processor; and the IR transmitter transmitting the target device data packets wirelessly to the external communication device.

5. The system of claim 2, wherein the control data packets comprise at least one of a beacon or a broadcast signal based on a predetermined two-way wireless communication protocol.

6. The system of claim 2, wherein the received data packets further comprise external data packets transmitted from the external communication device, the processor identifying the target device based on the external data packets, the processor transferring at least a portion of the external data packets over the network to the target device.

7. The system of claim 2, wherein the IR sensor is further configured to be a proximity sensor.

8. The system of claim 2, further comprising a control panel mounted proximate to the IR sensor and the processor, the control panel further comprising at least one of a backlight, an interface device, or interface circuitry, the processor comparing the control data packets and the received data packets, the processor activating at least one of the backlight, the interface device or the interface circuitry when at least one of the control data packets is the same as at least one of the received data packets.

9. A method for using an infrared sensor interconnected with a security system to communicate with an external communication device, comprising:

transmitting a control data packet with an infrared (IR) transmitter of an IR sensor;

receiving a received data packet with an IR receiver of the IR sensor;

comparing the control data packet and the received data packet to determine whether an external communication device has transmitted the received data packet; and establishing bi-directional communication between the external communication device and a target device when the control data packet and the received data packet are different with respect to each other, the target device being interconnected with the IR sensor and the security system on a network.

10. The method of claim 9, further comprising locating the IR sensor remote from a system control panel used to control operation of the security system, the IR sensor and the control panel being interconnected with the network.

11. The method of claim 9, further comprising:

storing identification codes to identify at least one external communication device approved to access the network; and determining whether the external communication device is allowed to access the network based on information within the received data packet and the identification codes.

12. The method of claim 9, further comprising:

generating target device data packets with the target device; and transmitting the target device data packets with the IR transmitter to the external communication device.

13. The method of claim 9, the received data packet further comprising external data packets transmitted from the external communication device, the method further comprising:

storing system configuration data identifying devices interconnected on the network; and identifying the target device based on information within the received data packet and the system configuration data.

14. The method of claim 9, further comprising determining that an object is within a predetermined proximity to the IR sensor when the control data packet and the received data packet are the same.

15. The method of claim 9, further comprising activating at least one of a program or a device when the control and received data packets are the same.

16. A security system, comprising:

a system control panel for monitoring at least one device on a network;

an infrared (IR) sensor having an IR transmitter and an IR receiver, the IR sensor located on the network, the IR transmitter having an active period and an idle period based on a duty cycle, the IR transmitter transmitting control data packets during the active period, the IR receiver receiving external data packets from an external communication device; and a processor configured to establish bi-directional communication between the external communication device and a target device located on the network, the processor detecting proximity of an object when the processor determines that at least one of the external data packets is a reflected control data packet.

17. The system of claim 16, further comprising a control panel housing the IR sensor, wherein the target device comprises any of the system control panel, the at least one device, and the control panel.

18. The system of claim 16, wherein the external data packets comprise at least one of information for identifying the target device or information for identifying an action requested by the external communication device.

19. The system of claim 16, the system further comprising a filter configured to sample IR data received by the IR receiver during the idle period and filter the external data packets based on the IR data.

* * * * *